June 15, 1954     J. N. APGAR     2,681,236
LOWER FIFTH WHEEL PLATE MOUNTING
Filed Dec. 28, 1950     3 Sheets-Sheet 1

Inventor:-
John N. Apgar,
Pierce, Scheffler - Parker,
Attorneys.

June 15, 1954  J. N. APGAR  2,681,236
LOWER FIFTH WHEEL PLATE MOUNTING
Filed Dec. 28, 1950  3 Sheets-Sheet 2

Inventor:
John N. Apgar,
by Pierce, Scheffler & Parker,
Attorneys.

June 15, 1954   J. N. APGAR   2,681,236
LOWER FIFTH WHEEL PLATE MOUNTING
Filed Dec. 28, 1950   3 Sheets-Sheet 3

Inventor:-
John N. Apgar,
By Pierce, Scheffler + Parker,
Attorneys.

Patented June 15, 1954

2,681,236

UNITED STATES PATENT OFFICE 2,681,236

LOWER FIFTH WHEEL PLATE MOUNTING

John N. Apgar, Bound Brook, N. J.

Application December 28, 1950, Serial No. 203,161

4 Claims. (Cl. 280—433)

This invention relates to tractor-semitrailer couplings of the general type, as described and claimed in my prior Patent No. 2,442,914, in which the rock shaft for the lower fifth wheel plate is supported upon a turntable, whereby the fifth wheel plates may be locked with the rock shaft parallel to the wheel-carrying axle of the semitrailer. More particularly, the invention relates to a coupling in which a second shaft is provided between the turntable and the fifth wheel plates, the second shaft being at right angles to the rock shaft and providing another freedom for oscillation of the tractor and semitrailer with respect to each other. For convenience in description, this second shaft will be hereinafter designated as an "oscillation shaft."

The conventional king pin coupling of the fifth wheel plates permits relative angular displacement of the tractor and the semitrailer units for travel along a horizontally curving roadway, and the rock shaft permits relative angular displacement of the units for travel along a vertically curving or hill-and-dale roadway. These two freedoms for relative angular movement of the tractor and semitrailer units about two axes at right angles to each other have been sufficient and entirely satisfactory for travel on roadways and smooth gently-rolling ground surfaces but have not afforded a sufficiently flexible coupling for travel of an assembly over rough terrain.

Objects of the invention are to provide couplings which permit relative angular movement of tractor and semitrailer units about three mutually perpendicular axes. Objects are to provide fifth wheel couplings which include a conventional rock shaft for supporting the lower fifth wheel plate and, in addition, an oscillation shaft at right angles to the rock shaft. A further object is to provide a coupling which includes an oscillation shaft, as above stated, and blocks which may be moved into position to prevent angular movement of the tractor and semitrailer units about the axis of the oscillation shaft. More specifically, an object is to provide a tractor-semitrailer coupling which includes a turntable for mounting on a tractor, a lower fifth wheel plate, and a pair of shafts at right angles and associated bearings supporting the plate upon the turntable for tilting movement with respect thereto.

These and other objects and the advantages of the invention will be apparent from the following specification when taken with the accompanying drawings in which.

The invention will be illustrated and described as incorporated in a turntable-fifth wheel coupling of the type described in my prior patent since the increased stability for the trailer, as compared with prior fifth wheels having rock shafts in fixed position on the tractors, is of major importance in tractor-trailer assemblies which are to be operated over rough terrain. It is to be understood, however, that the invention can be incorporated in the prior types of fifth wheels. Reference is made to the above-mentioned patent for an explanation of the trailer-stabilizing action of the turntable, and to my prior Patent No. 2,501,884 for an explanation of the reasons for and the method of operation of the positive-impositive latch which is provided for the turntable plates.

Figure 4:
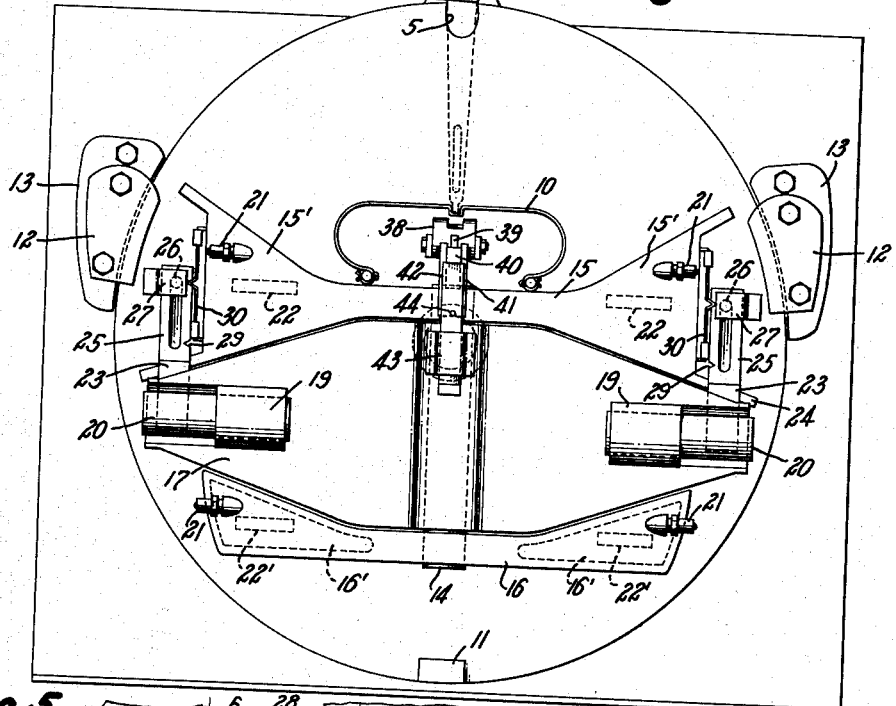
Fig. 4 is a plan view of the coupling as seen with the lower fifth wheel plate removed.
Figures 5, 6:
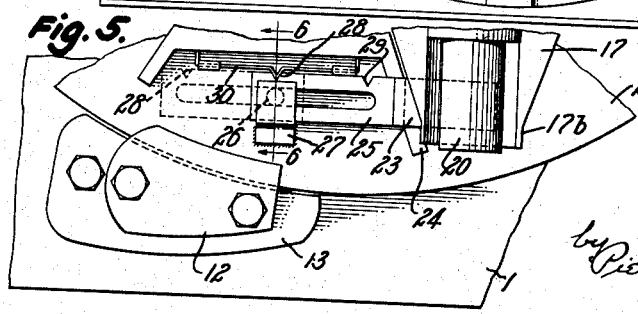
Fig. 5 is a fragmentary view on a larger scale, of one of the sliding blocks positioned, as shown in full line, to prevent oscillation of the fifth wheel plate with respect to the turntable.
Fig. 6 is a fragmentary sectional view, on line 6—6 of Fig. 5.

In the drawings, the reference numerals 1 and 2 identify a lower and an upper plate, respectively, which are in surface contact and pivotally connected by a hollow pin 3 to form a turntable. The lower plate 1 is preferably of rectangular shape, reinforced by a corrugated backing plate 4, and provided with openings, not shown, at appropriate points for receiving bolts for securing the plate 1 to a tractor unit. The upper turntable plate 2 is of substantially circular form and provided with a latch notch 5 at the central point on its forward edge. A latch arm 6 is pivotally supported upon a bracket 7 on the plate 1 by a pivot pin or bolt 8, and has a depending lug 9 for seating in the latch notch 5 of the turntable plate 2, see Fig. 4. The free end of the latch arm is received within the central notch of a C-shaped spring 10 mounted on the upper turntable plate 2 to afford an impositive latching of the upper turntable plate 2 to the lower plate 1. As will be described later, means is provided for converting this impositive latching to a positive latching or lock during the initial stages of a pick-up of a semitrailer unit by a tractor unit.

A stop lug 11 is set into a notch of the upper turntable plate 2, the stop lug being preferably diametrically opposite the latching notch 5 and with an outer surface which conforms to the circular periphery of the turntable plate. The stop lug 11 projects above the plate 2 for engagement with one or the other of a pair of combined stop and hold-down plates 12 which project over the turntable plate 2 and are carried by spacer members 13 secured to the lower turntable plate. The rearward edges of the plates 12 are shaped and positioned for engagement by the sides of the stop lug 11 upon rotation of the upper turntable plate through approximately 90°, and specifically 94° in the illustrated embodiment. The stop elements limit the relative angular relation of the tractor and trailer to about 90° and prevent damage to the tractor cab and the trailer when the latter is backed into a parking space at an angle to the tractor.

An oscillation shaft 14 is journalled in bearing members 15, 16 which are welded to and extend transversely of the upper turntable plate 2 when the latter is in its central position with respect to the lower plate 1. A walking beam 17 is supported upon the shaft 14 by a bearing member 18, the walking beam being of approximately diamond shape, as viewed in plan and also as seen when looking longitudinally of the tractor. This shape affords a maximum strength at a minimum weight when, as illustrated, the walking beam is of hollow box form and built up by welding plates to the bearing member 18. Bearing blocks 19 are set into the upper plate 17a of the walking beam 17 near the ends thereof to support stub shafts 20 which provide the customary rocking axis of a fifth wheel coupling, the blocks extending through the hollow beam to bear upon the lower plate 17b of the beam, see Fig. 8.

The forward bearing 15 is slightly in advance of the axis of the turntable coupling pin 3, and the rear bearing 16 is spaced to the rear of the pin 3 so that the axis of the stub shafts 20 is positioned a few inches, for example about four inches, to the rear of the axis of the pin 3. The bearing members 15, 16 have hollow end portions 15', 16' respectively which flare downwardly towards the plate 2 and also laterally to extend along and in close proximity to the walking beam 17. These hollow ends constitute grease reservoirs which may be filled through grease fittings 21, and slots 22, 22' are cut through the plate 2 for the flow of grease to the lower turntable plate 1. It will be noted that the slots 22 and 22' are at different radial distances from the turntable pin 3 to afford a good distribution of the lubricant over the entire surface between the turntable plates.

Heavy stop blocks 23 are provided on the turntable plate 2 at each side of the oscillation shaft 14, and the blocks are guided for sliding movement into and out of position beneath the outer ends of the lower plate 17b of the walking beam 17, thereby to prevent oscillation of the beam or alternatively to permit oscillation of the beam on the shaft 14. The blocks are guided by passing through slots formed by lugs 24 welded to the plate 2 and appropriately spaced from the adjacent ends of the bearing member 15, and by extension straps 25 which are integral with or welded to the blocks 23 and are slotted to receive guide pins 26 projecting from brackets or clips 27 which are secured to the plate 2 and extend over the straps 25. The straps 25 are provided with latching notches 28, 29 at their inner edge, and leaf springs 30 are mounted on the plate 2 and have a central V-projection for seating in the notches 28, 29 when the blocks 23 are in forward inactive positions and in rearward active positions respectively.

Figure 3:
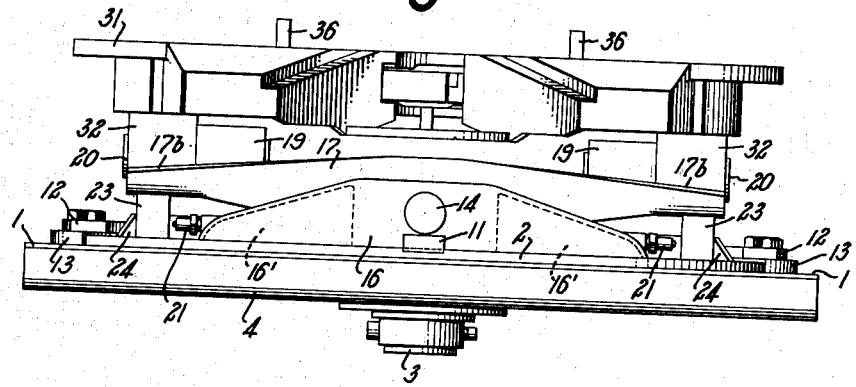
Fig. 3 is an end view of the same, as seen from the rear.
Figure 7:
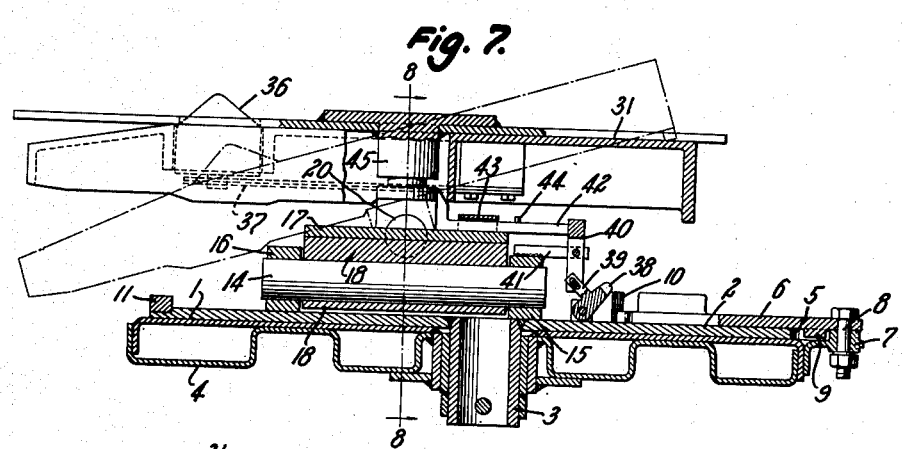
Fig. 7 is a substantially longitudinal central section through the coupling on line 7—7 of Fig. 1, and with a portion of the upper fifth wheel plate added.
Figure 8:
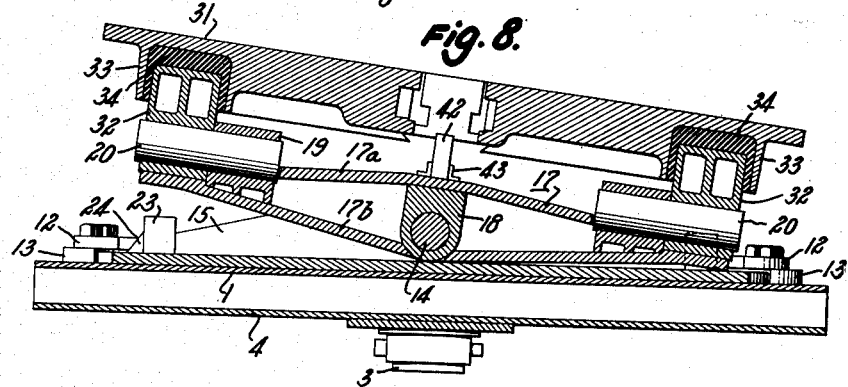
Fig. 8 is a transverse vertical section through the coupling on the plane of line 8—8 of Fig. 7, but showing the fifth wheel plate tilted with respect to the oscillation shaft.

The lower yoke-form plate 31 of a fifth wheel is supported for rocking movement on the stub shafts 20 by bearing blocks 32 whose upper ends extend into boxes 33 at the lower face of the plate 31, the block ends being spaced from the walls of the boxes by rubber caps 34 which permit some limited oscillation of the fifth wheel plate 31 with respect to the turntable when the blocks 23 are moved rearwardly to prevent oscillation of the walking beam 17 about the axis of the shaft 14, see Figs. 3 and 8. The stop blocks 23 are located vertically beneath the bearing blocks 32 when positioned to prevent movement of the walking beam 17, and the stub shafts 20 are thereby relieved from bending stresses and shocks. Mechanism is provided for locking a trailer king pin to the plate 31 when the king pin is fully seated in the end of the forked opening of the fifth wheel plate, but such mechanism is indicated only by the release handle 35 as the particular construction of the king pin lock forms no part of the present invention. Latch keys 36 at the ends of leaf springs 37 extend through openings in the fifth wheel plate for seating in slots in the upper fifth wheel plate, Figure 7, as described in Patent No. 2,442,914.

Figure 1:
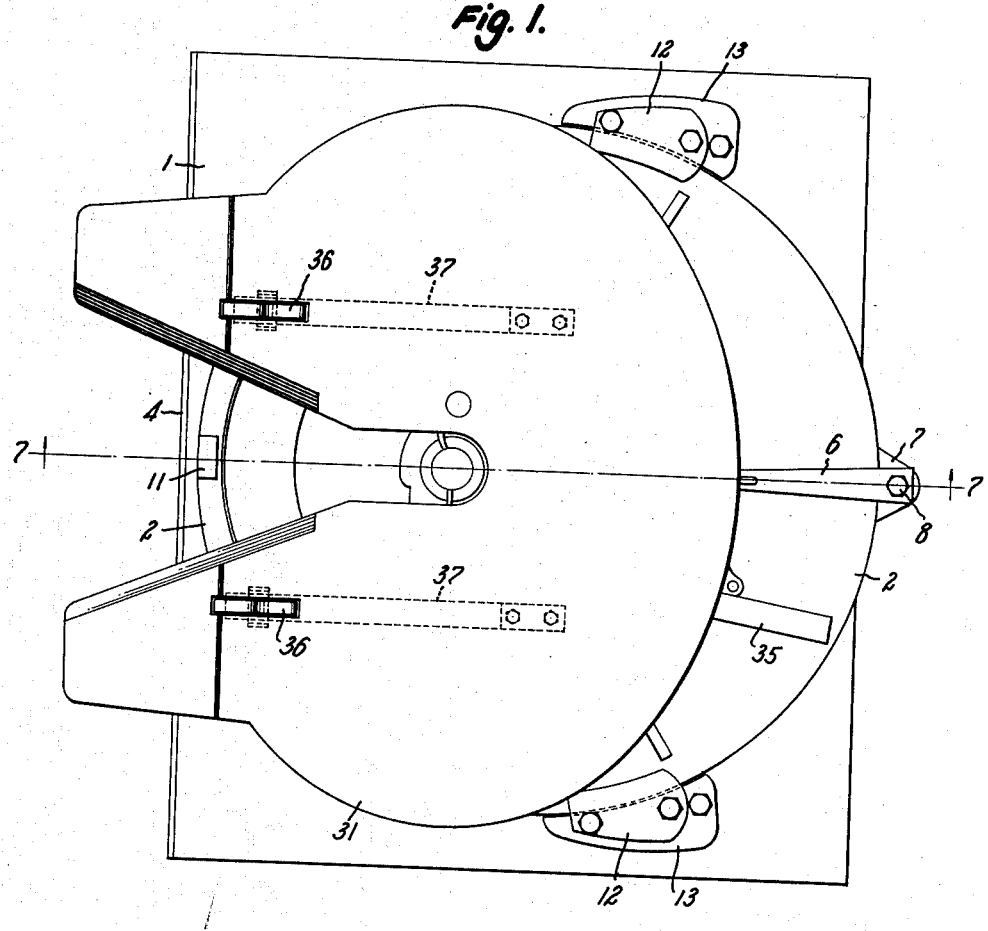
Figs. 1 and 2 are a plan view and a side elevation, respectively, of a coupling embodying the invention.
Figure 2:
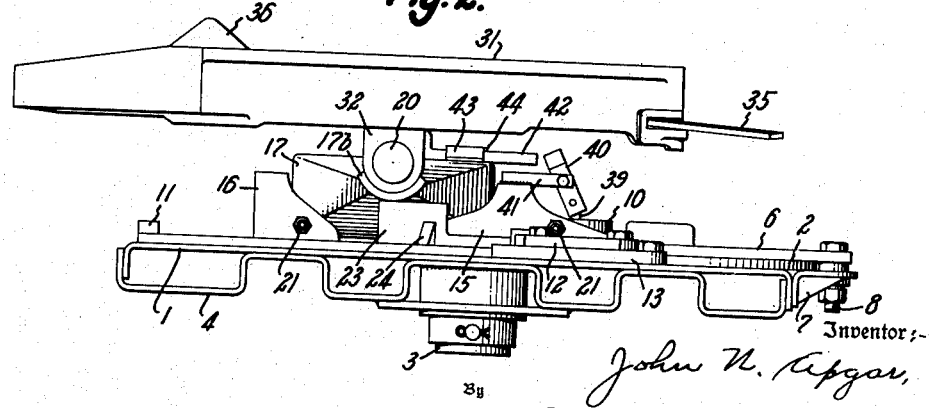
Figure 9:
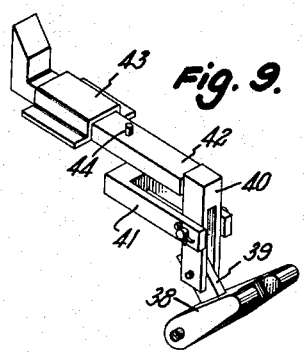
Fig. 9 is an enlarged perspective view of the turntable latch.

As noted above, means is provided for converting the impositive latch, comprising the latching arm 6 and the notched C-shaped spring 10, into a positive lock during the initial stages of a pick-up of a semitrailer by a tractor. A keeper plate 38 is pivotally supported on the plate 2 and has an outer edge forked to embrace the central notch of the latch spring 10 when the keeper plate is turned down into horizontal position. A slotted arm 39 fixed to or integral with the keeper plate 38 is received within and pivotally connected to the forked lower end of a lever 40 mounted on a strap 41 welded or otherwise secured to the central part of the forward bearing member 15, see Figs. 2, 4 and 9. The upper end of lever 40 is alined with the forward end of an L-shaped slide member 42 which extends through a guide sleeve or clip 43 on the walking beam 17 and is provided with a stop pin 44 which limits its rearward movement. The upper end of the short leg of the slide 42 is in the path of movement of the trailer king pin 45 when the slide 42 is moved rearwardly by turning the keeper plate down to lock the latch arm 6 against release from the spring 10 when a tractor is to pick up a trailer. As the king pin 45 reaches its end position for locking engagement with the fifth wheel plate, the king pin strikes the end of the slide and moves it forwardly to lift the keeper plate 38 into inoperative position, thereby permitting a release of the latch when the travel of the tractor-trailer assembly along a curved path results in a rigid coupling of the fifth wheel plates by the projection of the latch keys 36 into the slots of the upper fifth wheel plate.

For travel along a a highway or relatively smooth terrain, the blocks 23 are moved rearwardly to prevent oscillation of the walking beam 17 about the axis of the shaft 14. Limited oscillation of the lower fifth-wheel plate 31 is possible however in view of the rubber caps 34 and play or flexing of the turntable pin 3 in its bearing, but this latter is of limited extent as the stop and hold-down plates 12 extend over opposite sides of the upper turntable plate 2. When the tractor-trailer assembly is to travel over rough terrain, the blocks 23 are moved forwardly into inoperative position to permit oscillation of the walking beam and the lower turntable plate about the shaft 14.

It is to be understood that the invention is not limited to the particular construction herein illustrated and described as various changes which may occur to those familiar with the art fall within the spirit and scope of the invention as set forth in the following claims.

I claim:

1. In a coupling for a tractor-semitrailer assembly, the combination with a supporting plate for mounting on a tractor, and a lower fifthwheel plate, of means supporting said fifthwheel plate on said supporting plate for angular movement about two axes at right angles to each other; said supporting means comprising bearings on said supporting plate, an oscillation shaft journalled in said bearings, a walking beam on said oscillating shaft and extending transversely thereof, rock shaft means carried by said walking beam, means including bearing blocks on said rock shaft means and bearing boxes at the lower face of said fifth-wheel plate supporting the fifth-wheel plate upon said rock shaft means of the walking beam, said bearing blocks being seated within said bearing boxes, stop blocks slidably mounted on said supporting plate for movement into and out of position to prevent oscillation of said walking beam, said stop blocks being in vertical alinement with said bearing blocks and boxes when positioned to prevent oscillation of said walking beam.

2. The invention as recited in claim 1, in combination with resilient means in said bearing boxes and between the same and the respective bearing blocks.

3. The invention as recited in claim 1, wherein said supporting plate is the circular upper plate of a turntable comprising a pair of superposed and pivotally connected plates, and stop means is provided to limit angular movement of the upper turntable plate from a central position with respect to the lower turntable plate, and wherein said stop means comprises a stop lug at the edge of and extending above the circular upper turntable plate, and cooperating stop members secured to the lower plate at points spaced circumferentially from the stop lug when the upper turntable plate is in central position with respect to the lower turntable plate, said stop members extending over the edge of the upper turntable plate to limit tilting of the turntable plates with respect to each other and to engage said stop lug to limit angular movement of said upper turntable plate.

4. The invention as recited in claim 3, in combination with means for impositively latching said turntable plates to each other, keeper means movable into operative position to prevent release of said impositive latching means, and means including a slide member supported on and centrally of said walking beam for engagement by a trailer king pin to move said keeper means into inoperative position.

References Cited in the file of this patent

UNITED STATES PATENTS

| Number | Name | Date |
|---|---|---|
| 2,306,459 | Mennen | Dec. 29, 1942 |
| 2,320,278 | Johnston | May 25, 1943 |
| 2,501,884 | Apgar | Mar. 28, 1950 |